UNITED STATES PATENT OFFICE.

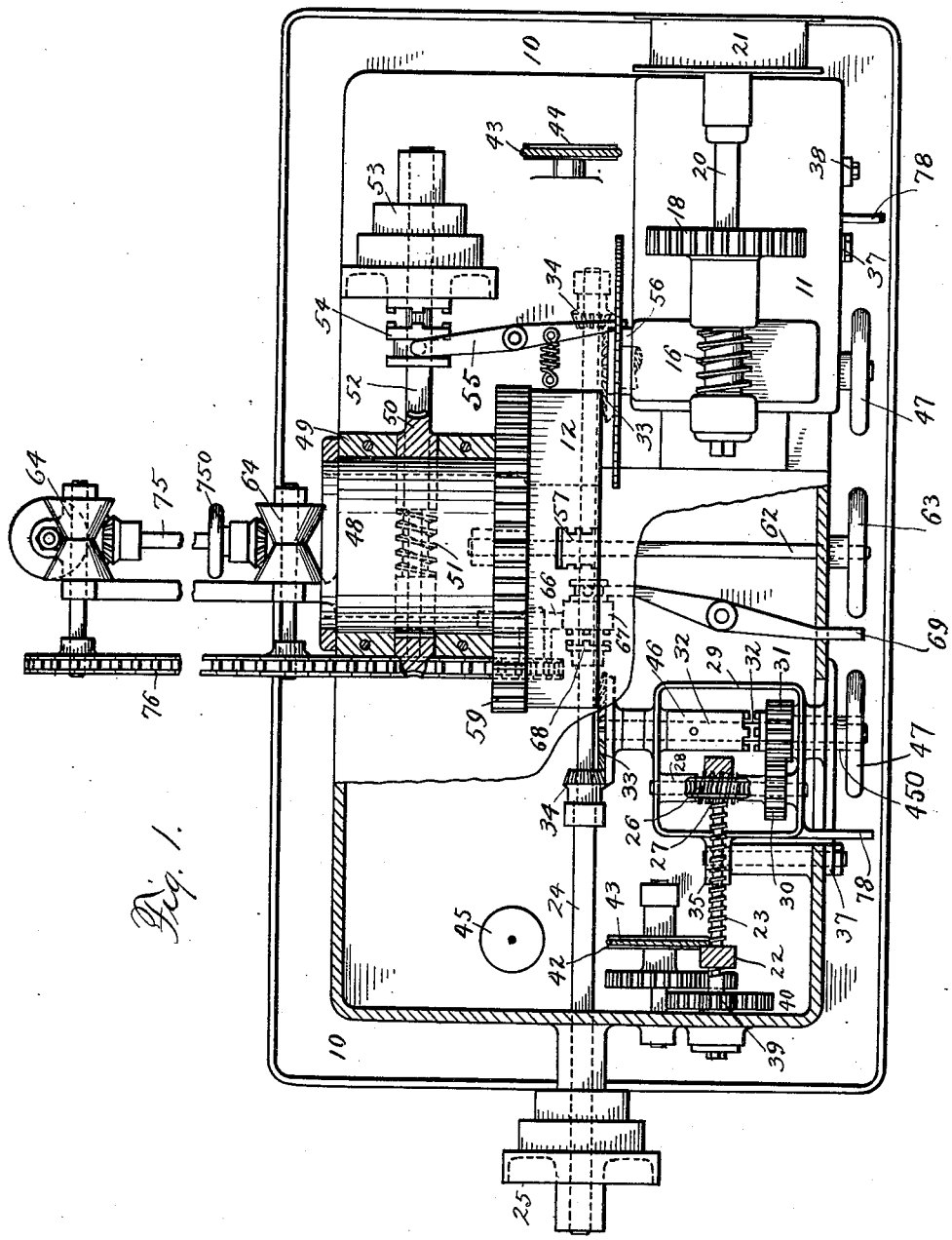

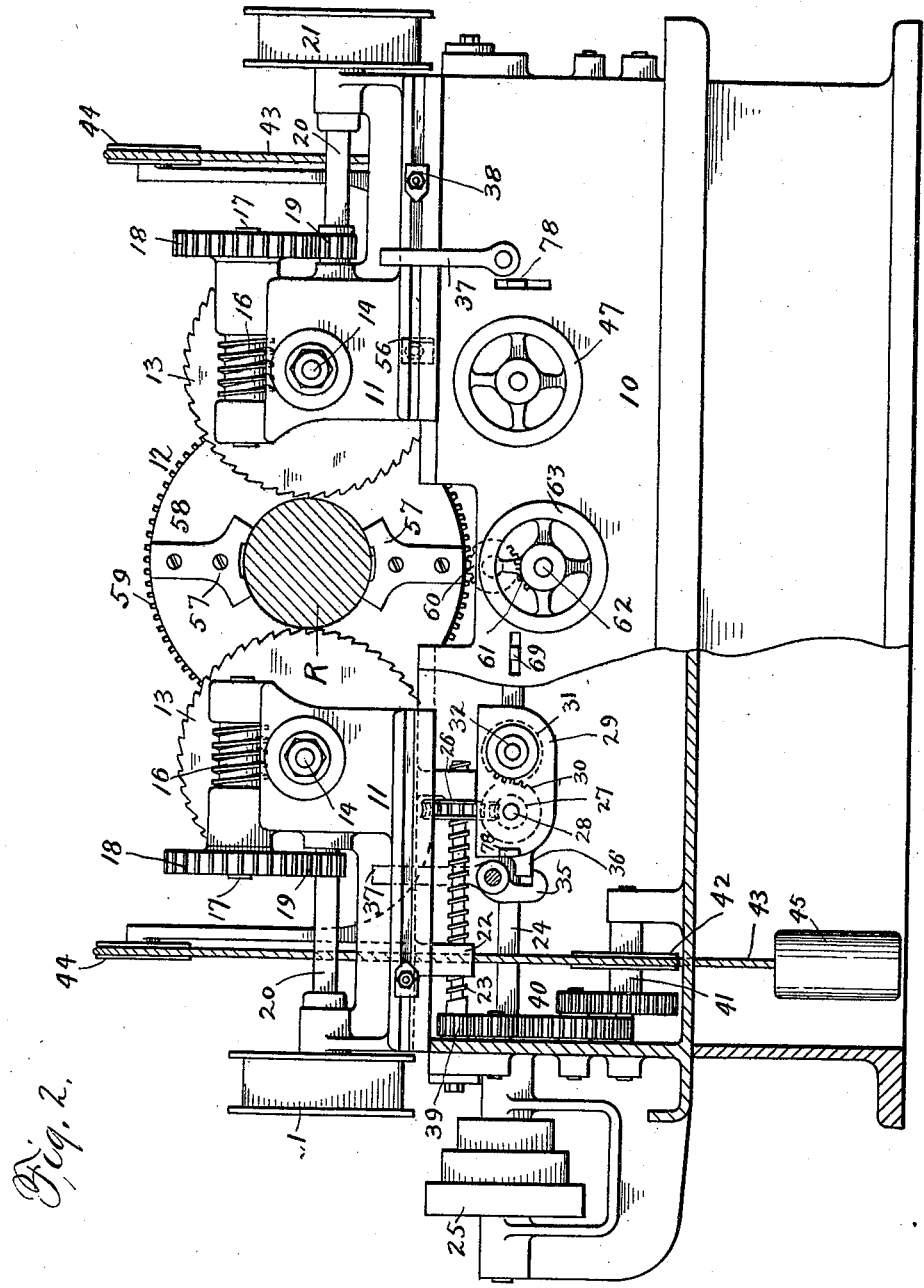

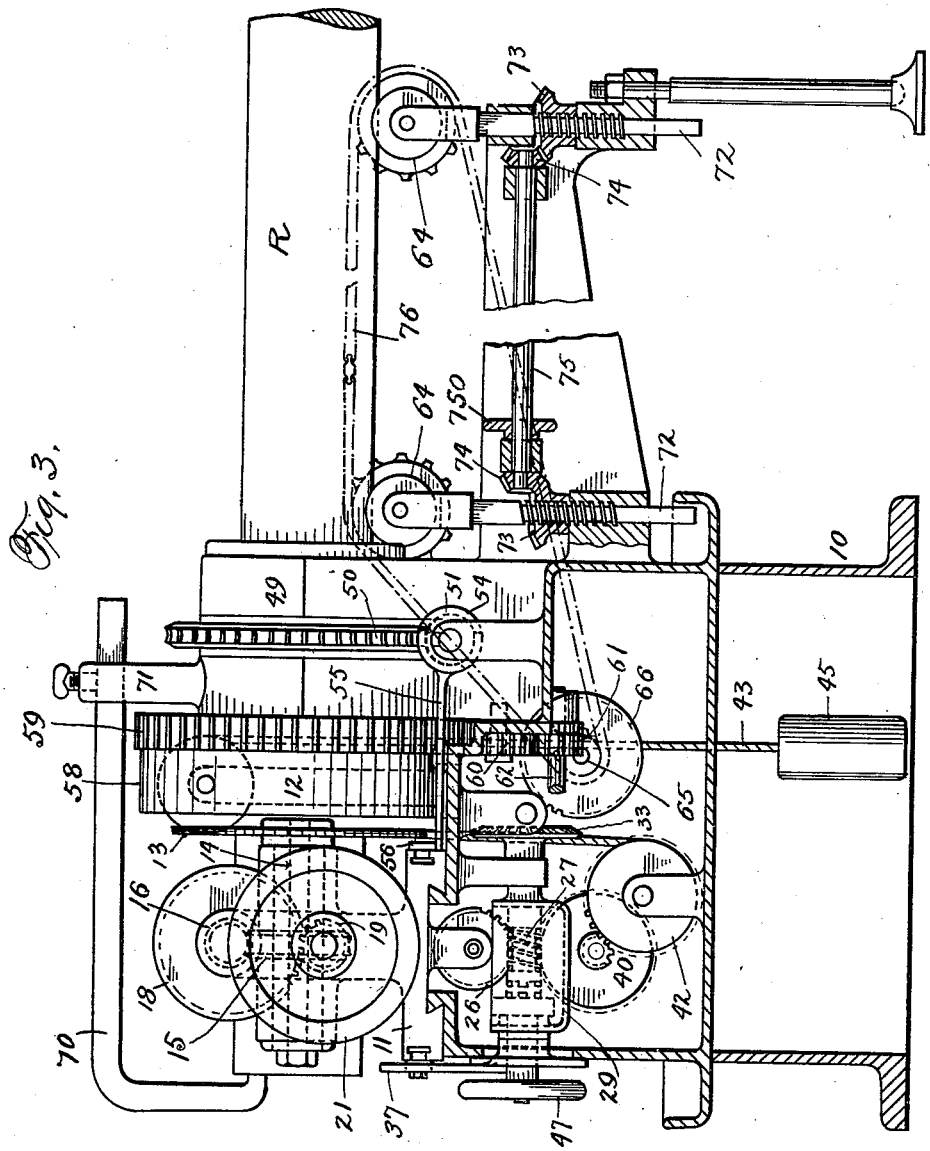

JAMES CHARLES POTTER, OF PAWTUCKET, RHODE ISLAND.

METAL-SAWING MACHINE.

1,098,167.

Specification of Letters Patent.

Patented May 26, 1914.

Application filed March 14, 1913. Serial No. 754,236.

*To all whom it may concern:*

Be it known that I, JAMES C. POTTER, of Pawtucket, in the county of Providence and in the State of Rhode Island, have invented a certain new and useful Improvement in Metal-Sawing Machines, and do hereby declare that the following is a full, clear, and exact description thereof.

The sawing of steel rods into lengths for subsequent machine operations, or handling, by the methods or appliances known to me, other than my present invention, is slow, due principally to the limitations of the saw speed and feed, and the object of my invention, therefore, is to enable this sawing to be done much more rapidly than heretofore, and as well make other improvements in this art which will render the operation of the machine more convenient and rapid.

In the accompanying drawings Figure 1 is a top plan view, partly in section and with parts broken away, of a sawing machine embodying my invention; Fig. 2 is a side elevation, partly in section; Fig. 3 is a vertical longitudinal section.

Generally described, my invention comprehends the use of circular saws which approach each other during a sawing operation, and one of which is retracted before they can meet; and turning or revolving the rod or stock during the sawing operation. Obviously, two saws simultaneously cutting, compared with the single saw heretofore used, will do the work twice as fast; and as the revolution of the rod during sawing, means the presentation of only a small surface for the action of the saws the rate of saw speed and feed can be much greater than is the case where, with a non-rotating rod, the limit of speed and feed is fixed by the large surface that a full diameter of the rod presents, because a circular saw in cutting through a stationary rod, must deal with a cut as extensive as the rod diameter. Again by the use of saws approaching each other while sawing, the diameter of each saw can be less than that of a single saw, by an amount equal to the diameter of the rod to be cut, for the single saw must be large enough to reach through the rod from side to side, whereas with two saws, each must reach through practically only half of the rod, and this difference in saw size means that the smaller saw which may be used with my invention is necessarily stiffer and hence can be run at a higher speed and faster feed, so that rapidity of work is further contributed to by that circumstance.

Of course my invention can be embodied in machines variously constructed and organized, and, hence, the machine shown in the drawings is to be considered as merely one form of my invention.

Proceeding now with a description of the details of the sawing machine shown, it will be found to comprise a base or frame 10, upon which are slidably mounted, two similar, but oppositely arranged saw-carrying slides 11, and a chuck 12, by which the rod to be sawed is supported between the two circular saws 13 and revolved, as hereinafter described. Each of the saw slides 11, has a mandrel 14 upon which saw 13 is mounted and for revolving the saw the mandrel has a worm wheel 15 with which meshes a worm 16 on a shaft 17 having a gear 18 in mesh with and receiving motion from a pinion 19 on a shaft 20 to which is secured a band wheel 21 to which power is applied to revolve the shaft 20.

On the underside of each slide 11, is a nut 22 which is engaged by a horizontal feed screw 23 which is revolved to feed the saw, by a train of gears from a driving shaft 24 having driving cone pulley 25, and which screw is revolved in the opposite direction to retract the saw when its cutting operation is ended, and the train for feeding becomes inactive, which it does automatically. The feeding revolution of the screw 23 is produced by a worm wheel 26 thereon, which receives motion from a worm 27 on a shaft 28 journaled in a swinging gear box 29, which shaft 28 has a gear 30 that meshes with a gear 31 on a shaft 32 which is the pivot for the gear box and which has at one end a bevel gear 33 which meshes with and receives motion from a bevel pinion 34 on the driving shaft 24. The gear box 29 is held in a raised position with the worm and worm wheel in mesh by a latch finger 35, which engages a lug or projection 36 on the gear box, and which finger has an arm 37 that extends in the path of a trip block 38 adjustably secured to the saw-slide 11, so that at the predetermined time in the feed travel of the saw, the latch 35 will be tripped and the gear box dropped to disengage the worm from the worm wheel and thereby stop the feed of the saw.

To revolve the feed screw to retract the saw after the feed gear has been disconnected, as just described, the feed screw has a pinion 39, which by a train of gears 40, is in power connection with a shaft 41 having on it a pulley 42 from which a chain or rope 43 runs to and over an elevated pulley 44 and suspends a weight 45, which being raised by the revolution of the feed screw for feeding the saw, acts by its descent to revolve said screw in the reverse direction to retract the saw slide.

It is desirable to feed the saw slide by hand, as for example, to quickly move the saw up to the work before beginning the cutting. To enable this to be done, the gear 31 is shiftable on the shaft 32 for which purpose it is mounted on a sleeve 450, and it has a clutch face for engaging the clutch face of a sleeve 46 pinned to the shaft 32, and upon the sleeve 450 at the front of the machine is a hand wheel 47 by which the gear 31 may be shifted axially to clutch and unclutch it, and revolved for feeding the saw slide by hand.

The rod chuck 12 is mounted on the end of a hollow spindle 48, journaled in a bearing 49 on the top of the machine base 10 and fixed to the spindle is a worm wheel 50 with which meshes a worm 51 on a horizontal shaft 52, and on the latter is a loose driving pulley 53 having a clutch face for engagement by a clutch collar 54 splined to the shaft and engaged by a shifting lever 55. The free end of the latter is in the path of a trip dog 56 secured to that one of the saw slides, whose feeding motion is first stopped, and in such position that the lever will be rocked and the driving pulley 53 unclutched to stop revolving the chuck before the feed of the other saw is stopped so that the feed of said other saw will continue, until the cut is made clear across, and as this arrangement insures that the completion of the saw cut will be to one side of the center of the piece of rod cut off, any fin that may be formed will be eccentric, and, hence, not be in the way of the provision of a center hole in the piece of rod for its subsequent machine handling. Inasmuch as the chuck spindle is revolved by worm gearing, it will be seen that on stopping the revolution of the worm shaft, the chuck spindle will be locked or held from turning by the engagement of the thread of the worm and the teeth of the worm wheel.

The chuck 12 is a scroll chuck the jaws 57 of which are carried by the shell 58 which has peripheral gear teeth 59 that are engaged by a pinion 60 in mesh with a pinion 61 on a shaft 62 which runs to the front of the machine where it has a hand wheel 63 for opening and closing the chuck. The stock or rod R is placed on two double-cone rollers 64, which are power-connected by sprocket gearing to a shaft 65 which has a gear 66 in mesh with a pinion 67 slidable on the driving shaft 24 so as to be clutched to and unclutched from a clutch collar 68 keyed to said shaft, a lever 69 extended to the front of the machine being provided for the convenient operation of the clutch collar for connecting and disconnecting the rod feeding rollers 63 with the shaft 24. An adjustable stop 70 is provided to limit the forward feed of the rod to suit the length to be cut off—said stop being supported by an arm 71 rising from the chuck spindle housing or bearing 49.

As rods of different diameter require different heights of the feeding rollers 64, the latter are vertically adjustable, each being mounted in bearings on a vertical screw shaft 72 which passes through a nut 73 consisting of a bevel gear in mesh with a like gear 74 on a horizontal shaft 75 having a hand wheel 750 by which said shaft may be revolved and thus both feed rollers 63 are simultaneously raised and lowered. The chain 76 of the sprocket gearing that drives the rollers 63 has enough slack to permit such vertical movement of the rollers as is required for their adjustment.

The operation of the machine will readily be understood. The chuck being open, the lever 69 is thrown to clutch the feed roller operating mechanism to the power shaft 24 until the proper length of rod is fed, as determined by the position of the stop 70, and then the lever 69 is operated to unclutch the feed roller operating mechanism, and the chuck operating hand wheel 63 is revolved to close the chuck on the rod. The two gear boxes 29 are next lifted (by means of a handle 78 for each that extends to the front of the machine) to mesh the worm and worm wheel of the feed screws of the two saw slides, and the gear 31 of the shaft 32 being unclutched from said shaft, the hand wheel 47 is revolved to feed the saw slides by hand to bring the saws up to the rod to begin sawing and then the gear 31 on shaft 32 is clutched thereto, so that the feeding of the saws by power is produced. Thereafter all the operations proceed automatically up to the point where the piece of rod is sawed off and the saws retracted ready for a fresh cutting operation.

It will be observed that all the parts, such as hand wheels, handles, etc., required for manipulation of the machine in operating upon stock of the same diameter, are at the front of the machine, and accessible to the workman without any change of position, which, of course, means saving of time and an increase in the output of the machine.

While I prefer to use two saws because of certain advantages in the use of two it is to be understood that the scope of my invention includes embodiments wherein more than two are used.

Having thus described my invention what I claim is—

1. A sawing machine having opposing saws, movable toward each other while sawing, and means to stop the feed of one saw at a point less than half the thickness of the work at the cut the feed of the other saw continuing to complete the cut.

2. In a sawing machine, the combination of a plurality of movably supported saws, means to move the saws toward each other during a sawing operation, and means to limit the travel of the saws in their approach to different distances with reference to the work.

3. In a sawing machine, the combination of a plurality of opposing saw supports, means for reciprocating said supports toward and from each other, the movements toward each other being the saw-feeding movement and being simultaneous, means to stop the feed of one of the saws at a predetermined point, and means to prolong the feeding movement of the other saw after such stoppage.

4. In a sawing machine, the combination of a plurality of opposing saw supports, means for reciprocating said supports toward and from each other, the movements toward each other being the saw-feeding movement, and being simultaneous, and means to earlier stop the feed of one saw and to retract the same the feed of the other saw continuing to complete the cut.

5. In a sawing machine, the combination of a pair of opposing saw supports, a drive shaft, gearing between said shaft and each of said supports, means controlled by the travel of the supports to disconnect their gearing at different times, and means to retract each support after the disconnection of its gearing.

6. In a sawing machine, the combination of a pair of opposing saw supports, a drive shaft, gearing between said shaft and each of said supports, means controlled by the travel of the supports to disconnect their gearing at different times, means to retract each support after the disconnection of its gearing, and hand-operated means to impart feeding movement to the saws independent of said shaft.

7. In a sawing machine, the combination of a base, opposing saw-carrying slides mounted on said base, automatically disconnectible gearing for moving said slides, hand engaging means to restore the gear connection, a work holder, or chuck, a hand engaging means to open and close the chuck, a power feeding mechanism for the work, and a hand-engaging means to control said feeding mechanism, all said hand-engaging means being at the same side of the machine base.

8. A sawing machine having a plurality of saws movable toward each other while cutting, and means to rotate the work during a sawing operation.

9. A sawing machine having a plurality of saws movable toward each other while cutting, means to rotate the work during a sawing operation, and means to stop the feed of one saw at a point less than one-half the thickness of the work at the cut, the feed of the other saw continuing to complete the cut.

10. A sawing machine having a plurality of saws movable toward each other while cutting, means to rotate the work during a sawing operation, means to stop the feed of one saw at a point less than one half the thickness of the work at the cut, the feed of the other saw continuing to complete the cut, and means to stop the rotation of the work before completion of the cut.

In testimony that I claim the foregoing I have hereunto set my hand.

JAMES CHARLES POTTER.

Witnesses:
 EARLE ROBERTS,
 EDWARD J. FEELEY.